(12) United States Patent
Dennes (10) Patent No.: US 7,817,444 B2
(45) Date of Patent: Oct. 19, 2010

(54) DETACHABLE CABLE MANAGER

(75) Inventor: Wayne William Dennes, Wyoming (AU)

(73) Assignee: ADC GmbH, Berlin (DE)

( * ) Notice: Subject to any disclaimer, the term of this patent is extended or adjusted under 35 U.S.C. 154(b) by 263 days.

(21) Appl. No.: 11/754,567

(22) Filed: May 29, 2007

(65) Prior Publication Data
US 2008/0130261 A1   Jun. 5, 2008

(30) Foreign Application Priority Data
Nov. 30, 2006   (AU)   ............... 2006906728

(51) Int. Cl.
*H02B 1/20* (2006.01)
(52) U.S. Cl. ............... 361/826; 361/825; 361/827
(58) Field of Classification Search ............... 361/825, 361/826, 827, 756; 174/100, 49, 50, 54, 174/60, 68.1, 72, 69, 70 R; 211/26, 756, 211/189
See application file for complete search history.

(56) References Cited

U.S. PATENT DOCUMENTS

| | | | |
|---|---|---|---|
| 3,491,971 A * | 1/1970 | Fisher ............... 248/65 |
| D243,655 S | 3/1977 | Matousek et al. |
| D318,391 S | 7/1991 | Greenhut et al. |
| 5,065,974 A | 11/1991 | Lapp |
| 5,085,384 A | 2/1992 | Kasubke |
| 5,145,137 A | 9/1992 | Choi |
| 5,353,167 A | 10/1994 | Kuklo et al. |
| 5,400,184 A | 3/1995 | Kuklo |
| 5,407,263 A | 4/1995 | Jones et al. |
| 5,743,497 A | 4/1998 | Michael |
| 5,782,440 A | 7/1998 | Ozga et al. |
| D403,016 S | 12/1998 | Bedol et al. |
| 5,911,602 A | 6/1999 | Vaden |
| 6,053,457 A | 4/2000 | Ozga et al. |
| D454,053 S | 3/2002 | Wong |
| 6,382,569 B1 * | 5/2002 | Schattner et al. ............... 248/74.1 |
| 6,568,542 B1 | 5/2003 | Chen |
| 6,590,785 B1 | 7/2003 | Lima et al. |
| 6,597,577 B1 | 7/2003 | Tang et al. |
| 6,600,665 B2 | 7/2003 | Lauchner |
| 6,661,651 B1 | 12/2003 | Tanzer et al. |
| 6,674,144 B1 | 1/2004 | Essaian |

(Continued)

FOREIGN PATENT DOCUMENTS

AU   708833   2/1998

(Continued)

OTHER PUBLICATIONS

Wiring Tutorial for 10BaseT Unshielded Twisted Pair (UTP). http://www.netspec.com/helpdesk/wiredoc.html. Jul. 26, 2007.

(Continued)

*Primary Examiner*—Jinhee J Lee
*Assistant Examiner*—Yuriy Semenenko
(74) *Attorney, Agent, or Firm*—Merchant & Gould P.C.

(57) ABSTRACT

A cable manager for arranging a plurality of electronic data cables in fixed positions for presentation to corresponding connection positions of an electronic communications connector block, including a plurality of cable guides for securing sections of the cables in spaced apart positions so that they converge at a common location remote from the cable manager.

19 Claims, 5 Drawing Sheets

U.S. PATENT DOCUMENTS

| | | | |
|---|---|---|---|
| 6,811,039 | B2 | 11/2004 | Chen et al. |
| D502,388 | S | 3/2005 | Cortez et al. |
| D508,394 | S | 8/2005 | Moffatt et al. |
| 6,945,504 | B2 | 9/2005 | Chen et al. |
| 7,077,688 | B2 * | 7/2006 | Peng .................... 439/471 |
| D560,474 | S | 1/2008 | Thrue |
| 7,317,623 | B2 | 1/2008 | Nguyen et al. |
| 7,336,484 | B2 | 2/2008 | McAnally et al. |
| 7,391,625 | B2 | 6/2008 | Mendoza |
| 2001/0031124 | A1 | 10/2001 | McGrath et al. |
| 2001/0038674 | A1 | 11/2001 | Trans |
| 2002/0050394 | A1 | 5/2002 | Clark et al. |
| 2002/0181633 | A1 | 12/2002 | Trans |
| 2003/0051892 | A1 | 3/2003 | Mattei et al. |
| 2003/0111241 | A1 | 6/2003 | Bahlmann et al. |
| 2003/0137925 | A1 | 7/2003 | Zamir |
| 2003/0186591 | A1 | 10/2003 | Jensen et al. |
| 2003/0206402 | A1 | 11/2003 | Tsuyuki et al. |
| 2003/0217863 | A1 | 11/2003 | Clark et al. |
| 2004/0026113 | A1 | 2/2004 | Bahlmann et al. |
| 2004/0035603 | A1 | 2/2004 | Clark et al. |
| 2004/0049321 | A1 | 3/2004 | Lehr et al. |
| 2005/0006132 | A1 | 1/2005 | Clark |
| 2005/0014420 | A1 | 1/2005 | Quenneville et al. |
| 2005/0029007 | A1 | 2/2005 | Nordin et al. |
| 2005/0052988 | A1 | 3/2005 | Tsatsanis et al. |
| 2005/0053097 | A1 | 3/2005 | Djokovic et al. |
| 2005/0053229 | A1 | 3/2005 | Tsatsanis et al. |
| 2005/0087361 | A1 | 4/2005 | Hayes et al. |
| 2005/0092514 | A1 | 5/2005 | Kenny et al. |
| 2005/0092515 | A1 | 5/2005 | Kenny et al. |
| 2005/0106948 | A1 | 5/2005 | Peng |
| 2005/0115736 | A1 | 6/2005 | Levesque et al. |
| 2005/0129218 | A1 | 6/2005 | Kimble et al. |
| 2005/0133246 | A1 | 6/2005 | Parke et al. |
| 2005/0142932 | A1 | 6/2005 | Levesque et al. |
| 2005/0167151 | A1 | 8/2005 | Kenny et al. |
| 2005/0169243 | A1 | 8/2005 | Lehr et al. |
| 2005/0169297 | A1 | 8/2005 | Lehr et al. |
| 2005/0186838 | A1 | 8/2005 | Debenedictis et al. |
| 2005/0186844 | A1 | 8/2005 | Hammond, Jr. et al. |
| 2005/0197005 | A1 | 9/2005 | Bentley |
| 2005/0199415 | A1 | 9/2005 | Glew |
| 2005/0205289 | A1 | 9/2005 | Kenny et al. |
| 2005/0207561 | A1 | 9/2005 | Hammond, Jr. |
| 2005/0221677 | A1 | 10/2005 | Hammond, Jr. et al. |
| 2005/0221678 | A1 | 10/2005 | Hammond, Jr. |
| 2005/0239338 | A1 | 10/2005 | Hashim |
| 2005/0247479 | A1 | 11/2005 | Kenny et al. |
| 2005/0263316 | A1 | 12/2005 | Matsumoto |
| 2005/0265013 | A1 * | 12/2005 | Keith et al. .................. 361/826 |
| 2005/0269125 | A1 | 12/2005 | Clark |
| 2005/0279528 | A1 | 12/2005 | Kenny et al. |
| 2006/0021772 | A1 | 2/2006 | Dellagala et al. |
| 2006/0032660 | A1 | 2/2006 | Parke et al. |
| 2007/0175835 | A1 | 8/2007 | Liang |
| 2007/0251893 | A1 | 11/2007 | Huang |
| 2008/0045076 | A1 | 2/2008 | Dittmann et al. |
| 2008/0130262 | A1 * | 6/2008 | Rinderer et al. ............. 361/826 |
| 2008/0135692 | A1 | 6/2008 | Herring et al. |

FOREIGN PATENT DOCUMENTS

FR  EC-000234166-0001  10/2004

OTHER PUBLICATIONS

Wiring Tutorial for 10BaseT Unshielded Twisted Pair (UTP). From www.web.archive.org. Nov. 17, 2006.
A Little Theory. http://www.duxcw.com/digest/Howto/network/cable/cable4.htm. Jul. 26, 2007.
A Little Theory. From www.web.archive.org. Oct. 29, 2006.
Alien Crosstalk—a Whatis.com definition. http://searchdatacenter.techtarget.com/sDefinition/0,290660,sid80_gci1084723,00.html. Jul. 26, 2007.
Alien Crosstalk—a Whatis.com definition. From www.web.archive.org. Nov. 29, 2004.
Powersum Alien Crosstalk: The Truth is Out There. http://www.belden.com/pdfs/Techpprs/pwrsumtp.htm. Jul. 26, 2007.
Powersum Alien Crosstalk: The Truth is Out There. From www.web.archive.org. Nov. 29, 2004.
Installation Effects Upon Alien Crosstalk and Equal Level Far End Crosstalk. http://www.belden.com/pdfs/Techpprs/ieacectp.htm. Jul. 26, 2007.
Installation Effects Upon Alien Crosstalk and Equal Level Far End Crosstalk. From www.web.archive.org. Oct. 31, 2006.
Twisted pair—Wikkipedia. http://en.wikipedia.org/wiki/Twisted_pair. Jul. 26, 2007.
Twisted pair—Wikkipedia. From www.web.archive.org. dated Nov. 27, 2006.
U.S. Appl. No. 29/280,445.
11801-aml © ISO/IEC:2008, p. 23 (Apr. 29, 2006).
SP-3-4426-AD10-B, draft 5.0 (to be published as TIA/EIA-568-B.2-10), p. 42 (Jul. 28, 2006).
Office Action mailed Apr. 14, 2009 in copending and commonly assigned U.S. Appl. No. 29/280,445, filed May 29, 2007, which is directed to the ornamental design of a cable manager.

* cited by examiner

DETACHABLE CABLE MANAGER

The present invention relates to a cable manager for arranging a plurality of electronic data cables in fixed positions for presentation to corresponding connection positions of an electronic communications connector block.

BACKGROUND

Electronic data cables are used in modern communication systems to carry voice and data signals between transmitters and receivers. Electronic data cables typically consist of a number of twisted pairs of insulated copper conductors held together as a cable in a common insulating jacket. Each twisted pair of conductors is used to carry a single stream of information. The two conductors are twisted together, at a certain twist rate, so that any external electromagnetic fields tend to influence the two conductors equally, thus a twisted pair is able to cancel much crosstalk (XT) caused by electromagnetic coupling from external sources. In a cable, adjacent twisted pairs are typically twisted at different twist rates so that each pair is still exposed to alternating lengths of the two conductors of its neighbouring pair. If all twist rates were the same, then one wire of a twisted pair would approximately be the same distance from one of the wires of its neighbouring twisted pair, thus allowing the first wire to constantly have the same electromagnetic coupling from a single wire of its neighbour along the wire length. Using different twist rates in one cable reduces crosstalk between twisted pairs.

High bandwidth communication systems may require a number of cables to be routed together in a cable bundle. When two lengths of cable are bundled in parallel, twisted pairs in neighbouring cables may have equal twist rates, and thus crosstalk (unbalanced electromagnetic coupling) between twisted pairs with the same twist rate, carrying different signals, will be more likely to occur than between twisted pairs in each cable. Electromagnetic coupling of signals between twisted pairs in adjacent cables is referred to as alien crosstalk (AXT).

Cable managers are used to locate ends of the cables in a cable bundle in fixed positions for presentation to corresponding connection positions of a connector block arranged in a communications equipment rack. Cable managers have previously included a plurality of channels, each being shaped to at least partially receive a corresponding terminal end of a cable. The plurality of channels diverge from a common point on the cable manager that is remote from the connector block. The channels fan out from the common point towards the corresponding connection positions of the connector block coupled thereto. The cable manager may allow undesirable levels of alien crosstalk between conductors of different cables for high bandwidth communication due to undesirable placement of the cables.

It is desirable to address one or more of the above-described difficulties, or at least provide a useful alternative.

SUMMARY

In accordance with the present invention, there is provided an A cable manager for arranging a plurality of electronic data cables in fixed positions for presentation to corresponding connection positions of an electronic communications connector block, including a plurality of cable guides for securing sections of the cables in spaced apart positions so that they converge at a common location remote from the cable manager.

Preferably, a distance x between said common location and the connection positions is sufficiently large to reduce alien crosstalk between data cables when in use below the Power Sun Alien Near End Cross Talk limit required for a Class F channel in ISO/IEC communications standard 11801:2002 Final Draft Amendment 1.

Preferably, a distance x between the common location and the connection positions is sufficiently large to reduce alien crosstalk between data cables when in use below the Power Sun Alien Near End Cross Talk limit required for a Category 6A channel in TIA/EIA communications standard TIA/EIA-568-B.2-10.

Preferably, wherein a convergence angle $\alpha$ between the common location and two outermost connection positions of the connector block is less than 90 degrees.

DESCRIPTION OF THE DRAWINGS

Preferred embodiments of the invention are hereafter described, by way of example only, with reference to the accompanying drawings wherein.

DETAILED DESCRIPTION OF PREFERRED EMBODIMENTS

A cable manager 10 shown in FIGS. 1 to 8 is used to arrange a plurality of electronic data cables 31 in fixed positions for presentation to corresponding connection positions 32 of an electronic communications connector block 34. The cable manager includes a plurality of cable guides 12 for securing sections of the cables 31 in spaced apart positions so that they converge at a common location 36 remote from the cable manager 34.

Alien crosstalk between cables 31 is particularly strong at the point where signals are transmitted into the cables 31. As signals travel along one of the cables 31 they tend to attenuate, and thereby reduce the external electromagnetic interference caused by any given electrical pulse as it travels along a length of one of the cables 31. In communications installations, however, it is advantageous to terminate many cables 31 in a confined space, for example, in a communications equipment rack and/or on a connector block 34. In the arrangement shown in FIG. 1, not drawn to scale, the cable manager 10 positions the cables 31 in a way that reduces alien crosstalk which arises in high bandwidth communications. Pairs 16 of cable guides 12 are arranged such that when cables 31 are held by the respective pairs 16 of cable guides 12, the cables 31 extend in "fanned" configuration from relatively more widely spaced locations adjacent a front edge 26 of the cable manager 10 to relatively more less spaced locations adjacent a back edge 27.

Figure 1:
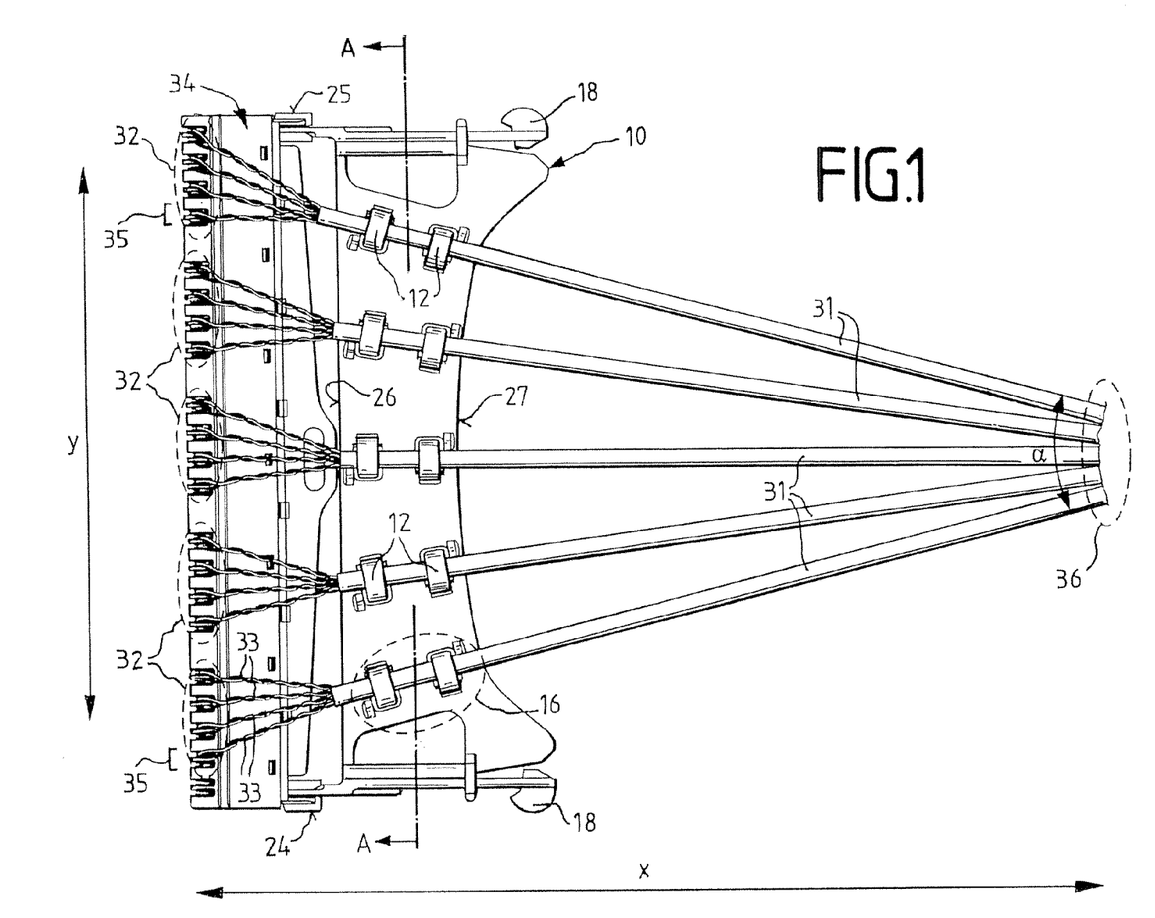
FIG. 1 is a diagrammatic illustration of a plan view of a cable manager shown connected to a connector block and an arrangement of cables.

The cable manager 10 is releasably fittable (i.e couplable) to the connector block 34. When so connected, a front side 26 of the cable manager 10 is preferably adjacent the connector block 34, and the back side 27 of the cable manager is spaced apart therefrom. The cable manager 10 includes clips 24, 25 projecting outwardly from opposite ends of the front side 26 towards the connector block 34. The clips 24, 25 facilitate attachment to the connector block 34. The connector block 34 is guided onto the clips 24, 25 so that they at least partially extend into the connector block 34. The connector block 34 and the cable manager 10 are forced together until the clips 24, 25 lock it into fixed positions. The cable manager 10 also has projections 18, projecting outwardly from the sides of the cable manager 10 adjacent opposite ends of the back side 27, which are used as finger grips and incorporate a screwdriver location for removal of the cable manager 10 from a mounting frame (e.g. a wall-mounted equipment frame).

The pair 16 of cable guides 12 is aligned along a common axis, and is adapted to secure a cable 31 in a substantially linear position between the connector block 34 and a common location 36 at the rear of the communications rack where the plurality of cables 31 converge into a bundle, for example. The plurality of electronic data cables 31 are secured by the cable manager 10 for presentation to respective ones of a plurality of connection positions 32 on the electronic communications connector block 34. The cables 31 secured in position by the cable manager 10 converge at the common location 36, which is remote from the connection positions 32. Thus, the cables 31 are brought into close proximity only after electronic signals entering the cables 31 at the connection positions 32 have reduced in amplitude (due to attenuation in each cable 31). Each pair 16 of cable guides 12 thereby defines a channel extending between a corresponding connection position 32 of the connector block 34 and the common location 36.

The cable manager arranges the cables 31 so that a convergence angle ($\alpha$), is less than 90 degrees. The convergence angle ($\alpha$) is the angle formed at the intersection of lines that pass through the outermost pairs 16 of cable guides 12 of the cable manager 10. The cables 31 are spaced apart for a distance back from the connector block 34 to reduce the alien cross talk to below a selected noise level.

A distance "x", as shown in FIG. 1, between the common location 36 and the connection positions 32 is selected to be as large as possible within the constraints (e.g. positioning and size) of the mounting frame of the connector block 34. A distance "y", also shown in FIG. 1, is the distance between the most remote of the connection positions 32 and is determined by the size of the connector block 34, and the spacing of the connection positions 32 for the cables 31. The distance "y" is for example the distance between a pair of Insulation Displacement Contacts (IDCs) 35 for a twisted pair 33 of a first twist rate of a first electronic data cable 31 secured at the far side of the cable manager 10 and the pair of IDCs corresponding to the twisted pair 33 with the first twist rate of a second cable secured on the other far side of the cable manager 10. The distance "y" may also be between the central points of the most remote connection positions. In practice, the distance "x" is typically approximately equal to the distance 'y' as shown in FIG. 1. For example the distance "x" between the common location 36 and the connection positions 32 is typically approximately 170 mm, and the distance "y" between the most remote connection positions 32 of the connector block 10, with "y" being measured between the centres of the most remote connection positions 32, is typically approximately 150 mm. The convergence angle ($\alpha$) may in practice be as large at 60 degrees, as determined by the space constraints. Typically, however, the convergence angle ($\alpha$) is approximately 48 degrees.

Increased spacing of cables 31 in the regions closest to the connector block 34 advantageously decreases alien crosstalk below a selected noise level. Advantageously, the selected noise level is that defined as channel limits in one of two communications standards: TIA/EIA and ISO/IEC. The combined effect of alien crosstalk is measured as the Power Sum Alien Near End Cross Talk (PS ANEXT). The channel limit for TIA/EIA is defined in the SP-3-4426-AD10-B document (draft 5.0)—which is to be published as TIA/EIA-568-B.2-10—with reference to the Category 6A channel limit. The channel limit for ISO/IEC is defined in the ISO/IEC 11801: 2002 Final Draft Amendment 1 document, with reference for the Class F channel limit.

The spacing between adjacent pairs of cables 31 is substantially equal so that crosstalk reduction between all adjacent pairs of cables 31 is substantially equal.

The cables 31 are secured so as to only bend by a small angle when joining into a parallel bundle at location 36. A minimum bending of the cables 31 at location 36 may reduce alien crosstalk between cables 31 below a selected noise level.

Each electronic data cable 31 includes four twisted pairs 33 of conductors, as shown in FIG. 1. Each twisted pair 33 is split from its corresponding data cable 31 between the connector block 34 and the corresponding pair 16 of cable guides 12. Each twisted pair 33 is seated in the connector block 34 in the corresponding pair of IDCs at the corresponding connection position 32 of the cable 31 of the twisted pair 33. Advantageously, the twisted pairs 33 are split at a point closer to the pair 16 of cable guides 12 than the connection position 32; this allows the twisted pairs to be placed flat across the upper face of the connector block 34, thereby providing a slimmer vertical profile than if the cables 31 were to extend onto the upper face of the connector block 34. The advantage of this slimmer vertical profile is that, when a plurality of connector blocks 34 are stacked vertically in a mounting rack or frame, there is more vertical space between adjacent connector blocks for the placement of a patch plug, for example, there between. The length of each twisted pair 33, between the point where it is split from its cable 31 and its corresponding IDC at the connection position 32, is preferably substantially equal to maintain an equal length for twisted pair 33 between the IDC and the other terminating end of the twisted pair 33 (for example, in a second connector block at the other terminating end of its cable 31). Substantially equal lengths of twisted pairs 33 provide for a selected level of timing synchronicity between signals in the pairs, preferably at a level required for Category 6A standard communications.

Figure 2:
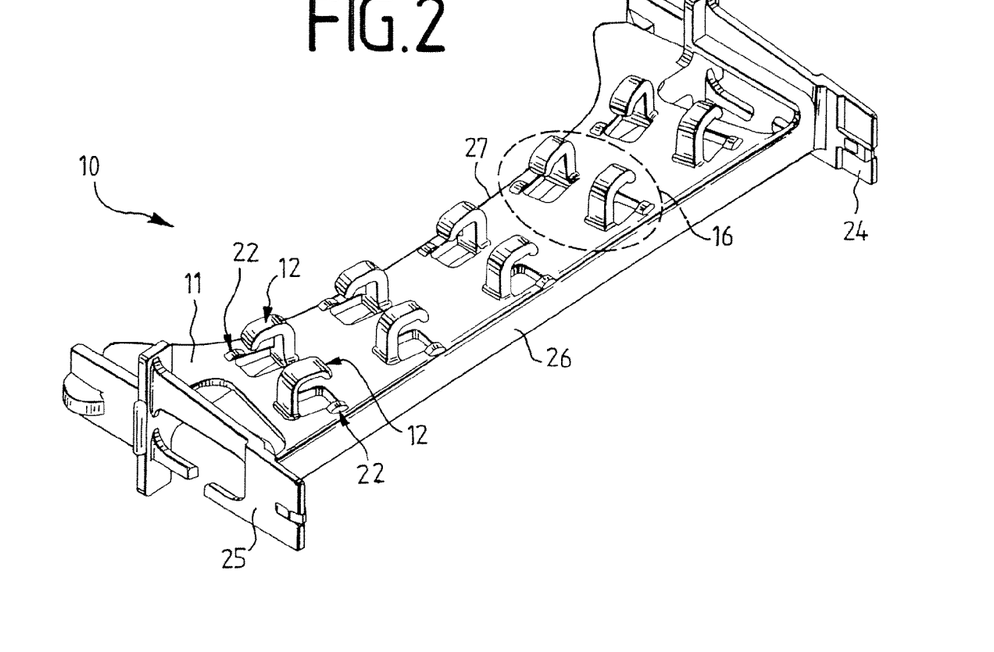
FIG. 2 is a diagrammatic illustration of a perspective view of the cable manager shown in FIG. 1.

As shown in FIG. 2, the cable manager 10 includes a generally planar base plate 11 upon which are mounted a plurality of cable guides 12, each of which is adapted to secure one of the electronic data cable 31 to the plate 11. The cable guides 12 include clips that are of somewhat inverted "L" shape. The cable guides 12 are arranged in pairs 16. Each pair of cable guides 12 is positioned in a spaced relationship along the intended path of a respective cable 31.

Figure 3:
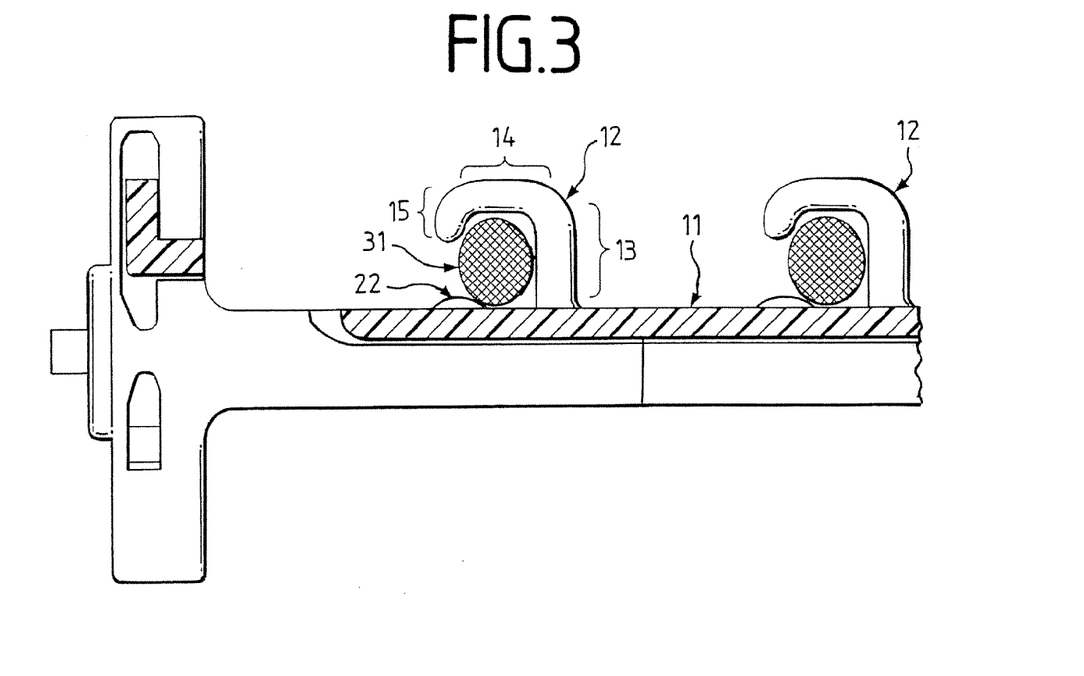
FIG. 3 is a diagrammatic illustration of a part cross sectional view of the cable manager shown in FIG. 1 through the line A-A.
Figure 4:
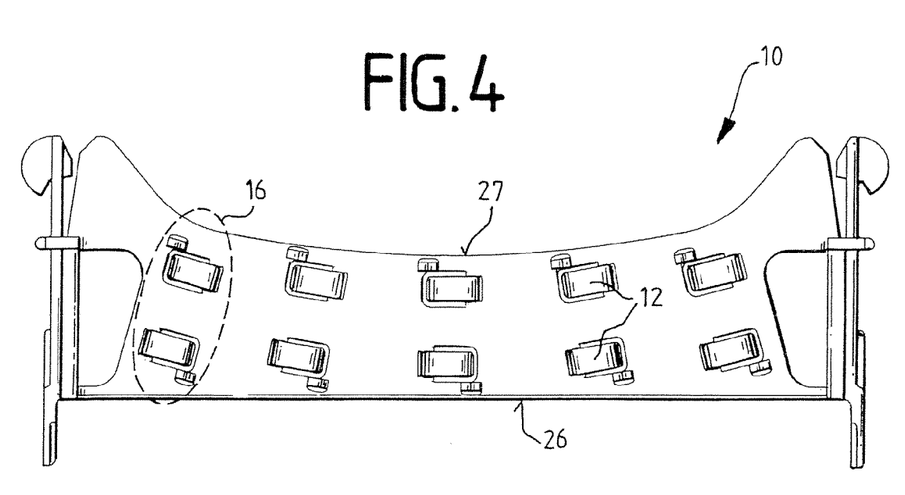
FIG. 4 is a diagrammatic illustration of a plan view of the cable manager shown in FIG. 1.
Figure 5:
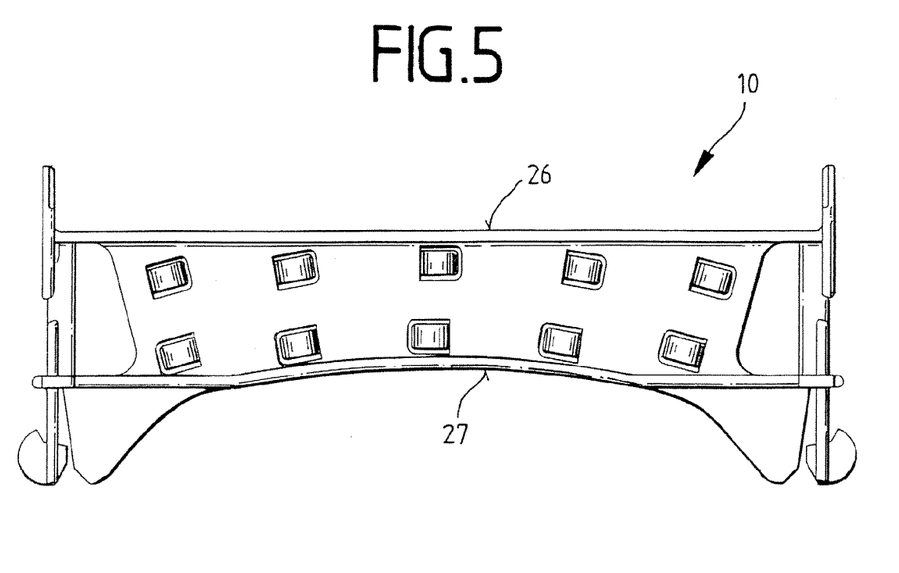
FIG. 5 is a diagrammatic illustration of an underside view of the cable manager shown in FIG. 1.
Figure 6:
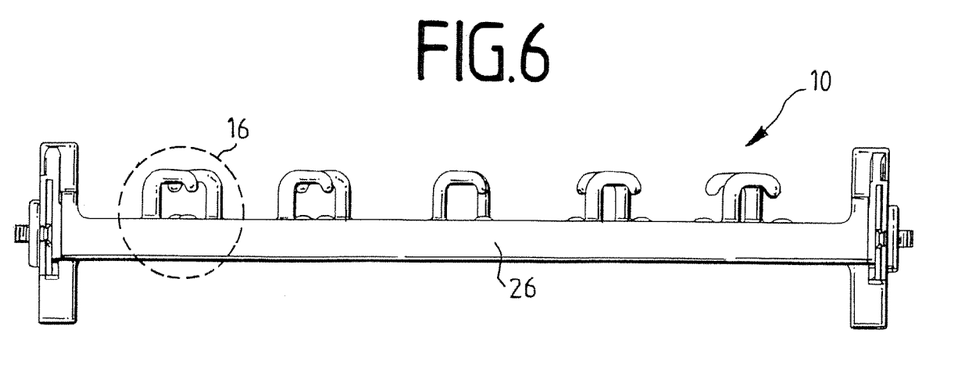
FIG. 6 is a diagrammatic illustration of a front view of the cable manager shown in FIG. 1.
Figure 7:
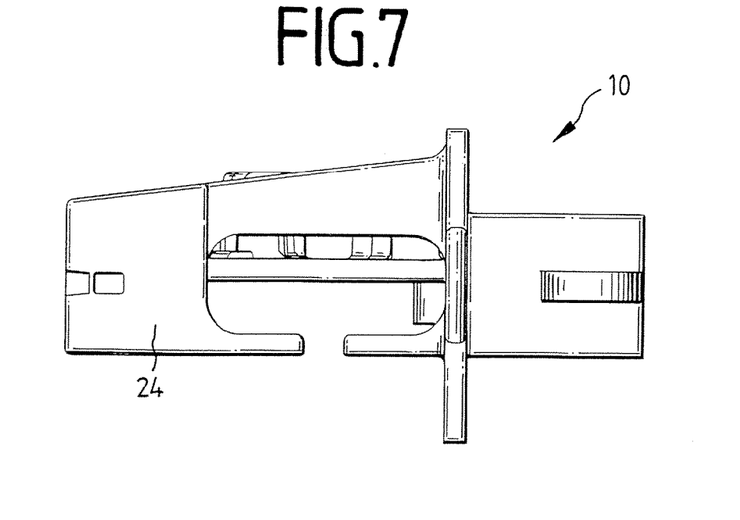
FIG. 7 is a diagrammatic illustration of a side view of the cable manager shown in FIG. 1.
Figure 8:
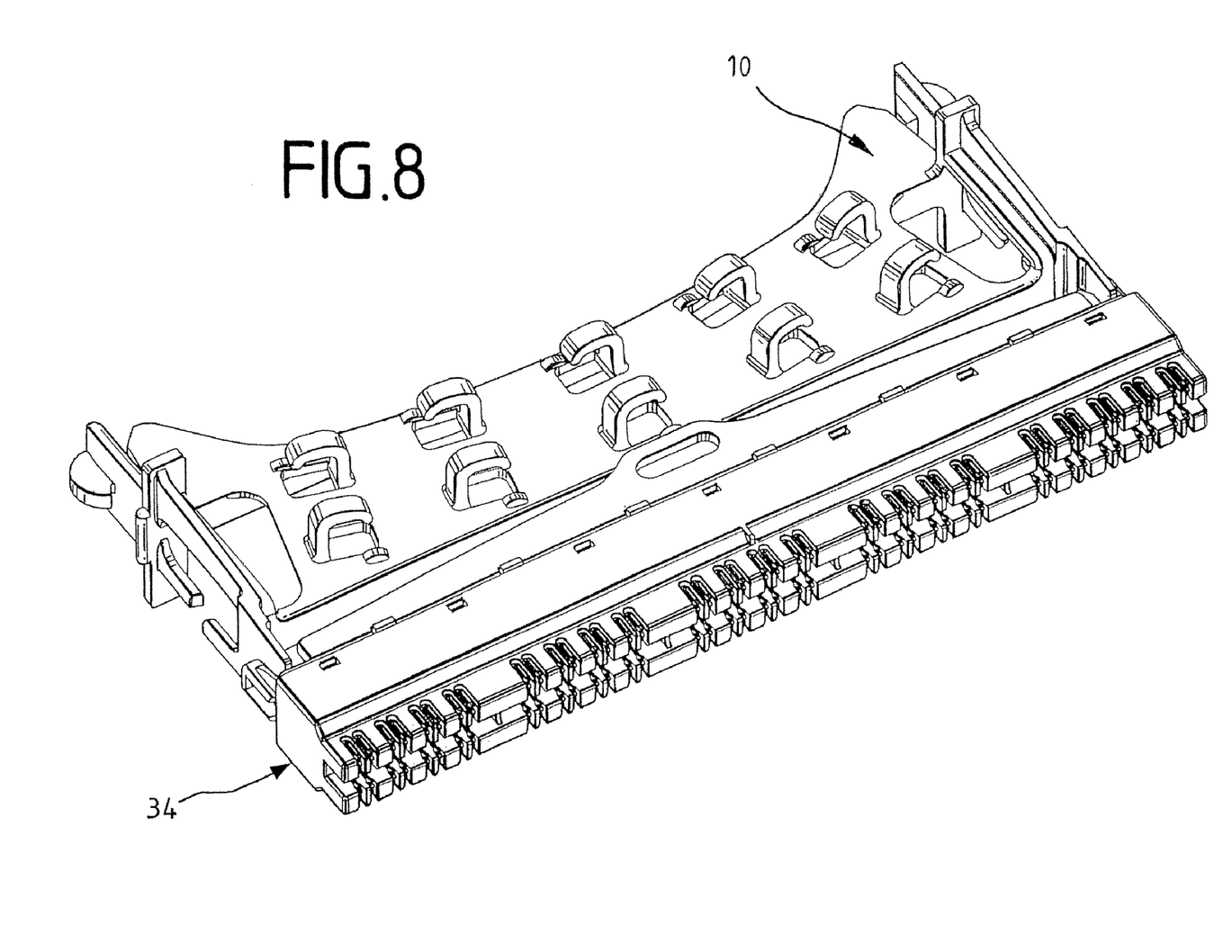
FIG. 8 is a diagrammatic illustration of a perspective view of the cable manager connected to the connector block shown in FIG. 1.

As shown in FIG. 3, the cable guides 12 of each pair 16 are similar. Each includes a clip having a first portion 13 extending from the base plate 11 leading to a second clip portion 14 that extends above over the surface of the base plate 11 in spaced relationship thereto, and a third downwardly depending clip portion 15 extending from the end of the second portion remote from the first portion 13 downwardly a short distance towards the surface of the base plate 11. The clips are each therefore of somewhat hook-shape, with one "leg" of the hook longer than the other and joining to the base plate 11. The first portions 13 of each pair 16 of clips are located at opposite sides of the path of the respective cable 31 to be secured by the pair 16 of cable guides 12. In addition, upstanding protrusions 22 are provided on the surface of the base plate 11 and spaced apart in the intended direction of extent of the cable 31, at locations below but spaced from the third clip portion 15. The clips and protrusions 22 are positioned and configured such that a suitably dimensioned cable 31 can be slid between the protrusions and the second portion 14 by transverse movement of the cable 31 adjacent the surface of the base plate 11, such that under resilient deformation of the clip and/or the cable 31, the cable 31 can be squeezed over the protrusions 22 and under the third portion 15 to be captured by the clip between the first, second and third portions 13, 14, 15 thereof and the surface of the base plate 11 and its protrusions 22, by reversion of the clip and/the cable 31 to the initial form thereof under natural resilience thereof. The cable 31, once captured by the clip, is secured without substantial deformation, which may advantageously reduce cross talk and electronic interference. Advantageously, a cable 31 with a non-circular cross section, is secured by the clip without being substantially deformed in cross-section, thus maintaining the cross-talk performance of the cable 31.

FIG. 3 shows a cross-sectional view of an electronic data cable 31 secured by a clip and protrusion 22. Each cable is secured by a pair 16 of clips; the two clips in a pair 16 face in opposite directions to grip the cable from opposite sides.

In an alternative cable manager 10, the cables 31 are secured in their corresponding fixed positions for presentation to the corresponding plurality of connection positions 32 on the electronic communications block 34 by means of cable guides 12 formed in the body of the cable manager 10, or attached to the body of the cable manager 10. The cable guides 12 may be non-conducting clamps, channels shaped in the cable manager 10, or other structures fixable in relation to each other and the connector block 34.

It is to be appreciated that the embodiments of the invention described above with reference to the accompanying drawings have been given by way of example only and that modification and additional components may be provided to enhance the performance of the apparatus.

Throughout this specification and the claims which follow, unless the context requires otherwise, the word 'comprise,' and variations such as 'comprises' and 'comprising,' will be understood to imply the inclusion of a stated integer or step, or group of stated integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LIST OF PARTS

| | |
|---|---|
| 10 | cable manager |
| 11 | base plate |

-continued

LIST OF PARTS

| | |
|---|---|
| 12 | cable guide |
| 13 | first portion |
| 14 | second portion |
| 15 | third portion |
| 16 | pairs |
| 18 | projections |
| 22 | protrusions |
| 24, 25 | clip features |
| 26 | front edge |
| 27 | back edge |
| 31 | cable |
| 32 | connection positions |
| 33 | twisted pair |
| 34 | connector block |
| 35 | pair of IDCs |
| 36 | common location |
| 38 | convergence angle $\alpha$ |
| 40 | distance x |
| 42 | distance y |

The claims defining the invention are as follows:

1. A cable manager for arranging a plurality of electronic data cables in fixed positions for presentation to corresponding connection positions of an electronic communications connector block, the cable manager comprising:
   a base plate having a first side and a second side;
   a plurality of cable guides arranged on the base plate to define a plurality of spaced, linear channels extending generally between the first and second sides of the base plate, the cable guides being configured to secure sections of the electronic data cables to the base plate, and each channel being oriented at an angle relative to each other channel to direct the electronic data cables to converge at a common location remote from the cable manager.

2. The cable manager claimed in claim 1, wherein the base plate defines a substantially planar surface, and wherein the cable guides are arranged on the substantially planar surface.

3. The cable manager claimed in claim 2, wherein the cable guides are arranged in pairs, each pair defining one of the linear channels, each of the linear channels extending between a corresponding connection position of the connector block and said common location.

4. The cable manager claimed in claim 3, wherein the cable guides include clips adapted to receive the sections of the electronic data cables and to secure the electronic data cables to the cable manager.

5. The cable manager claimed in claim 4, wherein each clip includes a corresponding upstanding protrusion arranged such that one of the electronic data cables can be slid between one of the clips and the corresponding protrusion by transverse movement of the cable.

6. The cable manager claimed in claim 5, wherein each clip and corresponding protrusion are shaped to resiliently engage the electronic data cable and thereby secure the electronic data cable to the cable manager.

7. The cable manager claimed in claim 1, further comprising a fastener for releasably coupling the cable manager to the connector block.

8. The cable manager claimed in claim 7, further comprising a fastener for coupling the cable manager to a wall-mounted equipment frame.

9. The cable manager claimed in claim 1, wherein the cable manager reduces alien crosstalk between the electronic data cables when in use.

10. The cable manager claimed claim 1, wherein a distance x between said common location and the connection positions is sufficiently large to reduce alien crosstalk between the electronic data cables when in use.

11. The cable manager claimed in claim 1, wherein a distance x between the common location and the connection positions is as great as possible within the confines of an equipment rack that seats the electronic communications connector block.

12. The cable manager claimed in claim 1, wherein a distance x between the common location and the connection positions is greater than half of a distance y between the most remote of the connection positions.

13. The cable manager claimed in claim 1, wherein a distance x between the common location and the connection positions is greater than or equal to a distance y between the most remote of the connection positions.

14. The cable manager claimed in claim 1, wherein a distance x between the common location and the connection positions is substantially equal to 170 mm and a distance y between the most remote of the connection positions is substantially equal to 150 mm.

15. The cable manager claimed in claim 3, wherein a convergence angle $\alpha$ formed at an intersection of the electronic data cables routed through the outermost pairs of cable guides of the cable manager is less than 90 degrees.

16. The cable manager claimed in claim 15, wherein the convergence angle $\alpha$ formed at the intersection is less than or equal to 60 degrees.

17. The cable manager claimed in claim 16, wherein the convergence angle $\alpha$ formed at the intersection is less than 30 degrees.

18. The cable manager as claimed in claim 4, wherein each clip defines a hook shape.

19. A connection system comprising:
a connector block defining a plurality of connection positions;
a cable manager including a plurality of cable guides arranged on a base plate, the base plate including clips configured to fasten the cable manager to the connector block, the cable guides being arranged in pairs to define channels through which cables can be routed, the pairs of cable guides being arranged to orient the channels in a non-parallel configuration; and
a plurality of cables each extending from a first end to a second end, each cable including at least one twisted pair of conductors, wherein the twisted pair of each cable extends from the first end of the cable to one of the connection positions defined by the connector block, and wherein the second ends of the cables converge at a common location.

* * * * *

UNITED STATES PATENT AND TRADEMARK OFFICE
CERTIFICATE OF CORRECTION

PATENT NO.        : 7,817,444 B2
APPLICATION NO.   : 11/754567
DATED             : October 19, 2010
INVENTOR(S)       : Dennes It is certified that error appears in the above-identified patent and that said Letters Patent is hereby corrected as shown below:

Front page, (56) References Cited, U.S. Patent Documents: insert the following U.S. Patents in appropriate order:

--6,826,056    11/2004    Tsuyuki et al.
6,946,605    09/2005    Levesque et al.--

Front page, (56) References Cited, Other Publications: insert --Notice of Allowance mailed October 13, 2009 in copending and commonly assigned design application no. 29/280,445, filed 05-29-2007, which is directed to the ornamental design of a cable manager.-- in appropriate order Signed and Sealed this
Sixteenth Day of August, 2011

David J. Kappos
*Director of the United States Patent and Trademark Office*